United States Patent [19]

Liu

[11] Patent Number: 4,687,603

[45] Date of Patent: Aug. 18, 1987

[54] COOLING TOWER

[76] Inventor: Wen H. Liu, No. 139, Chung Hua Road, Miao Li City, Taiwan

[21] Appl. No.: 835,528

[22] Filed: Mar. 3, 1986

[51] Int. Cl.$^4$ .............................................. B01F 3/04
[52] U.S. Cl. ........................................ 261/24; 261/89
[58] Field of Search ............................ 261/89, 90, 24

[56] References Cited

U.S. PATENT DOCUMENTS

| 1,771,364 | 7/1930 | Wagner | 261/89 |
| 2,125,581 | 8/1938 | Pearce | 261/89 |
| 2,793,710 | 5/1957 | Robinson | 261/89 |
| 2,889,005 | 6/1959 | Umbricht | 261/89 |
| 3,358,413 | 12/1967 | Kalika | 261/89 |
| 4,294,781 | 10/1981 | Holmquist | 261/89 |
| 4,382,900 | 5/1983 | Wem | 261/89 |

FOREIGN PATENT DOCUMENTS

| 437783 | 4/1912 | France | 261/89 |
| 154309 | 11/1920 | United Kingdom | 261/89 |

*Primary Examiner*—Tim Miles
*Attorney, Agent, or Firm*—Steinberg & Raskin

[57] ABSTRACT

A counter-flow forced-draft type cooling tower comprising an outer structure, the top of which has an opening, a centrifugal fan which is an integral part of a rotatable cylinder. The rotatable cylinder has numerous small apertures. A screen which is coaxial with the cylinder. A motor mounted underneath the cylinder which rotates the cylinder. An annular corrugated water guiding plate on the side wall of the outer structure, an inclined water collecting plate under the water guiding plate. Ventilation louvers which are disposed underneath the outer structure. A water tank which is disposed under the louver to collect the cooled water and which has a floating valve to control the amount of water contained therein. The lower provides an inlet for outside air. The air then flows upwards, and is sucked into the rotating cylinder by the centrifugal fan, which also slings hot water radially out of the cylinder. Next the air goes out through the opening of the top cover. A spraying head which sprays water into the cylinder comprising the centrifugal fan. A guiding plate and a water collecting plate for controlling water flow.

1 Claim, 4 Drawing Figures

COOLING TOWER

BACKGROUND OF THE INVENTION

This invention relates generally to a cooling tower and in particular to a counter-flow forced-draft type cooling tower.

Conventionally, cooling towers are divided into three types. These are the atmospheric, natural draft and forced draft types. These three types, in turn may be sub-classified into counter-flow or cross-flow type cooling towers.

In an atmospheric type cooling tower, high temperature water is pumped to the top of the cooling tower, where it then falls as a free body. During the free fall period heat is transferred from the higher temperature water to the lower temperature air, thereby decreasing the temperature of the water.

The atmospheric cooling tower has the simplest design of the three above-mentioned types, but its efficiency is quite low.

In a natural draft type cooling tower, the cooling tower is basically a chimney which causes the low temperature air to flow upwards. High temperature water is then sprayed from the the top of the cooling tower, and falls downwards. When the water and air come into contact, heat is transferred from the water to the air. Since the flowrate of air within the cooling tower is affected by the wind speed around the cooling tower, its efficiency fluctuates.

In forced-draft type cooling towers, low temperature air is drawn into the cooling tower mechanically. This increases the efficiency of heat exchange between the high-temperature water and the low temperature air over natural draft type cooling towers. However, a cross-flow forced-draft type cooling tower have a great disadvantage that it takes up more space than a counter-flow type cooling tower.

Although the counter-flow forced-draft type cooling tower is more efficient than other types of cooling towers, it is still possible to improve it. Therefore the object of the present invention is to provide a counter-flow forced-draft type cooling tower with a higher heat exchange rate than prior art.

As shown on FIG. 4, a conventional counter-flow forced-draft type cooling tower usually has a fan 201 disposed above the cooling tower 200'. This can be improved as shown on the following detailed description to increase its function.

SUMMARY

A primary object of this invention is to provide a cooling tower whose efficiency is greater than that of prior arts.

Another object of this invention is to provide a cooling tower which is both simple in structure and useful in air-conditioning systems.

Further objects and advantages of the present invention will become apparent as the following description proceeds, and the features of novelty which characterize the invention be pointed out with particularity in the claims annexed to and forming a part of this invention.

DETAILED DESCRIPTION OF THE PREFERRED EMBODIMENT

Figure 1:
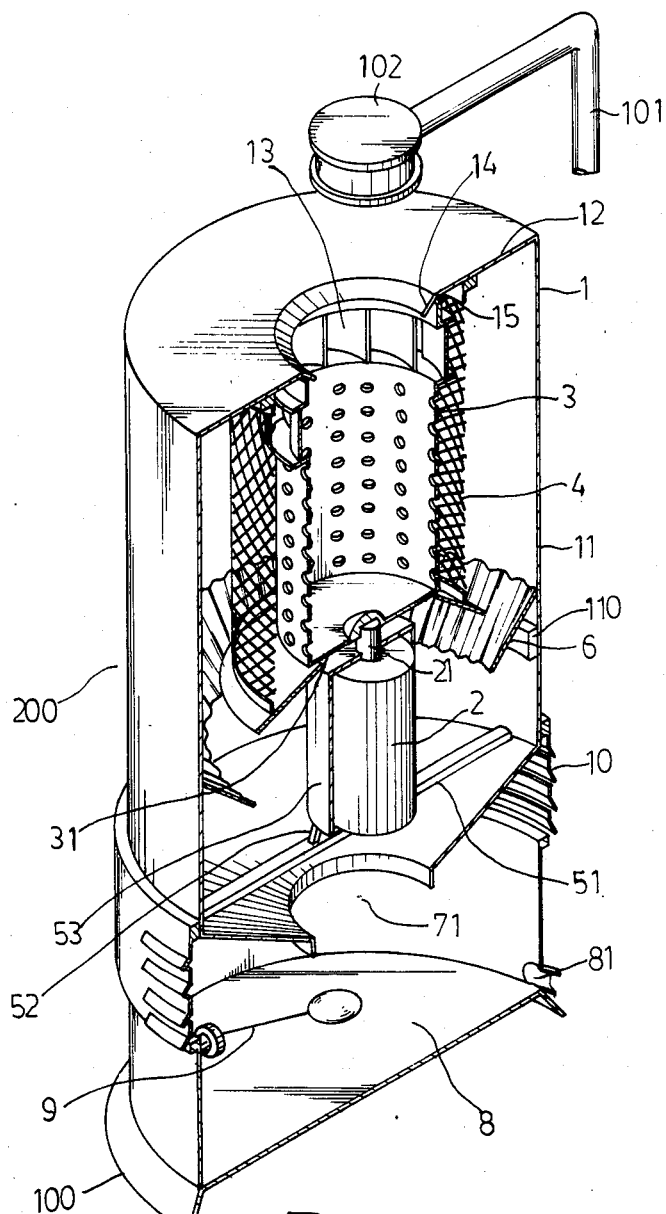
FIG. 1 is a cross-sectional view of a preferred embodiment of the present invention.

Referring to the drawings, and in particular to FIG. 1, it can be seen that the present invention comprises an outer structure 1, a motor 2 which is fixed on a bracket 5, a rotating cylinder 3, a screen 4 concentrically positioned around the cylinder 3, a water guiding plate 6 and a water collecting plate 7 attached to the outer structure 1, a water tank 8 under the outer structure 1, a floating valve 9 which is mounted on the tank 8, a louver 10 between the outer structure 1 and the tank 8 for ventilation, and the base 100 which supports the whole structure.

The outer structure 1 comprises a side wall 11 under which a louver 10 is connected, and a top cover 12. The top cover 12 of the outer structure 1 has a circular opening 13 in the center. Low temperature air comes into the cooling tower through the louver 10, passes through the interior of the outer structure 1 and goes out through the opening 13.

The edges of the opening face inwards to form an inclined portion 14 which prevents recirculation of air from the gap 15 between the top cover 12 and the cylinder 3.

There is a bracket 5 inside the outer structure 11 to support the motor 2 and the rotatable cylinder 3. The bracket 5 has four legs 52 secured on beams 51 and supports the motor seat 53. The motor seat 53 in turn supports the motor 2. The motor 2 in the motor seat 53 engages with the bottom 31 of the rotatable cylinder 3 with its spindle 21. The main power supply 110 is on the side wall 11 and supplies the motor 2 with electric power.

Figure 2:
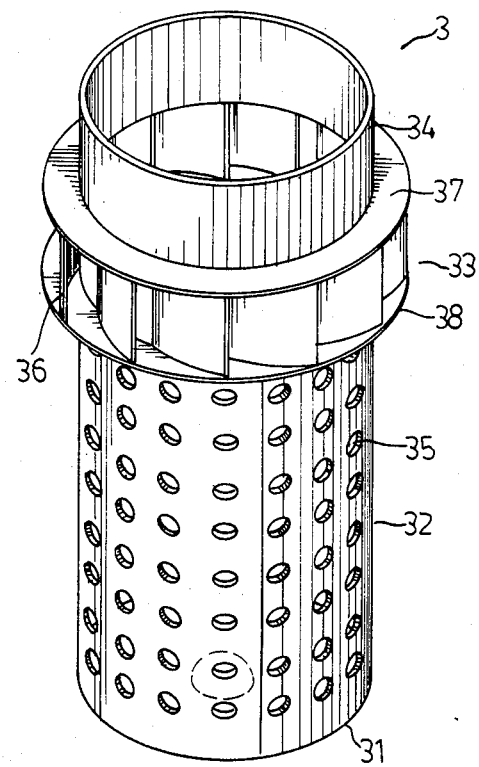
FIG. 2 is a perspective view of the rotating cylinder.

Referring to FIG. 2, it can be seen that the rotatable cylinder 3 comprises a bottom portion 31, a holed portion 32, a centrifugal fan 33 and a top portion 34. The holed portion 32 has a plurality of apertures 35 which allow the water droplets to be slung outwards. The centrifugal fan 33 comprises a plurality of blades 36 which are secured between the first and second flanges 37 and 38. The first flange 37 is secured on the top portion 34, the second flange 38 is secured on the holed portion 33. The centrifugal fan 33 rotates along with the cylinder 3, drawing the air from the interior of the outer structure 1 into the cylinder 3 and propelling this air out of the outer structure 1 through the opening 13. Therefore an air flow is generated within the outer structure, with low temperature air being continuously drawn into the outer structure. The top portion 34 is as close as possible to the top cover 12 in order to decrease the width of the gap 15 between the top cover 12 and the cylinder 3. This reduces recirculation of air within the cylinder 3.

Figure 3:
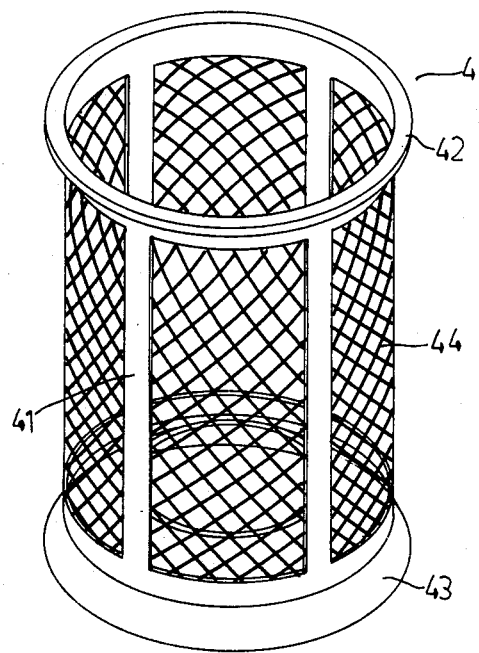
FIG. 3 is a perspective view of the screen.
Figure 4:
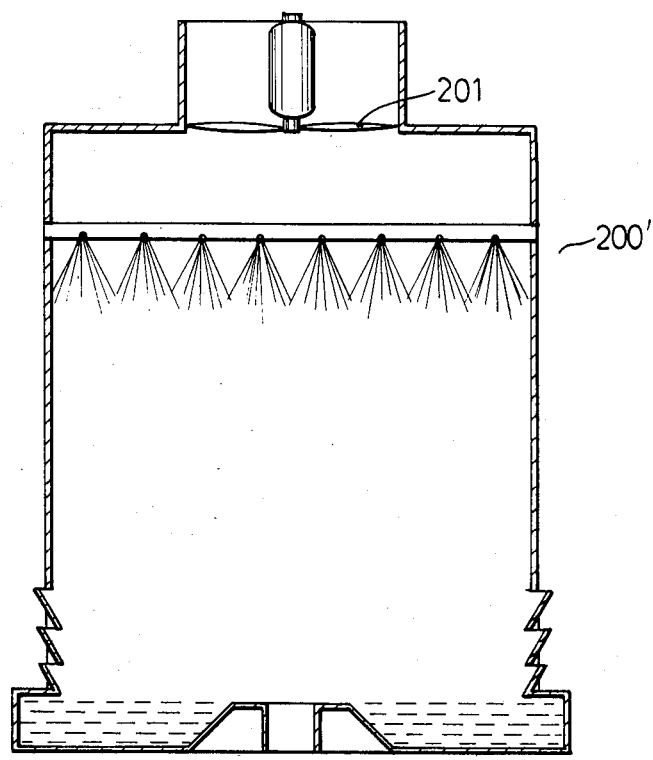
FIG. 4 is prior art of a counter-flow forced-draft type cooling tower (cross-sectional view).

Referring to FIG. 3, a screen 4 comprises a frame 41, which includes a flange 42 and a skirt 43 and a net 44 which is adherent to the frame 4. The screen 4 is secured concentrically around the rotating cylinder 3 under the top cover 12 of the outer structure 1 by fixing the flange 42 to the top cover 12. The net 44 partially blocks the water droplets and further divides them into smaller droplets, which in turn increases the overall surface area of the water which is available for heat exchange with the low temperature air. The skirt 43 functions as both a guide for the water and a water guard for the motor seat 53.

An annular water guiding plate 6, which is corrugated in order to guide the water droplets and increase the surface area of the water which contacts with the low temperature air, is slanted downwards between the skirt 43 and the beams 51 thereby guiding its flow to a water collecting plate 7, then to the water tank 8.

An annular water collecting plate 7 which is also slanted downwards from the side wall 11 below bracket 5 guides water to the central opening 71. The water then falls into the water tank 8.

The water tank 8 receives and stores the water. The amount of water within the tank 8 is controlled by a floating valve 9, which is connected to the water tank 8. When the tank is full, the valve 9 cuts off the supply of water. The water within the tank 8 flows out via the outlet 81. A control valve (not shown in the drawings) may be provided at the outlet 81 to control the out-flow of water.

A louver 10 is disposed between the outer structure 1 and the water tank 8 in order to allow the low temperature air to enter freely. A base 100 supports the whole structure.

Piping 101 serves as a conduit for high-temperature water to flow to the opening 13 on the top cover 12. Preferably, a sprayer head 102 is attached to the piping 101 to disperse the high temperature water into droplets so as to increase the heat exchange between the high temperature water and the low temperature air.

The operation of the cooling tower 200 of the present invention is decribed as follows.

High temperature water is sent through piping 101 to the sprayer head 102 by a pump (not shown) or some other means. The sprayer head 102 disperses the high temperature water into droplets which will fall downwards towards the rotating cylinder 3.

Some of the water is slung out through the apertures 35 in the cylinder 3 before reaching the bottom 31 of the cylinder 3. This is a result of the centrifugal force caused by the rotation of the cylinder 3. The remaining portion of the water falls to the bottom portion 31 of the cylinder and is also slung outwards by the centrifugal force of the cylinder.

Some of the droplets which are slung out of the cylinder 3 hit the screen 4 and drop to the skirt 43. Some reach the screen 4 and pass through the net 44. The rest fall to the skirt 43. The water then flows by gravity to the guiding plate 6 and then to the collecting plate 7. Then it flows down to the water tank 8. Simultaneously, low temperature air is drawn into the outer structure 1 by a centrifugal fan 33 where it passes through the central opening 71 and flows upwards. It is then sucked into the fan 33 and propelled out of the outer structure 1 through the opening 13.

Since the flow of air from the fan 33 is opposite to the direction of water droplets' flow, the high temperature water is cooled along its way to the water tank 8. When water droplets are slung out of the cylinder 3 and the screen 4, they mix with air flow from the central opening 71 and their temperature is further decreased. Then, the water droplets fall downwards and their temperature is further decreased to an acceptable level due to the heat transfer between the high temperature water droplets and the low temperature air which is drawn in through the louver 10. Therefore, when the water finally flows into the water tank 8, its temperature is low enough for reutilization or for disposal into the environment.

As various possible embodiments might be made of the above invention without departing from the scope of the invention, it is to be understood that all matter herein described or shown in the accompanying drawing is to be interpreted as illustrative and not in a limiting sense. Thus it will be appreciated that the drawings are exemplary of a preferred embodiment of the invention.

I claim:

1. a cooling tower comprising:

an outer structure composed of a side wall and a top cover, said top cover having an opening on its center with a deflection device for reducing re-circulation of air within the housing a motor which is fixed in a motor seat and whose shaft forms a spindle which rotates a rotatable cylinder;

a rotatable cylinder having sides which have a plurality of small apertures, a centrifugal fan being an integral part of the rotating cylinder, the bottom portion of said cylinder engaging said shaft of said motor, said centrifugal fan comprising:

a first flange on the top portion, a second flange on the portion with apertures, a plurality of blades which are equally spaced and fixed between said first and second flanges;

a screen positioned concentrically around said rotatable cylinder and secured onto the inside of the top cover of the outer structure, said screen comprising a net and a frame, said frame further comprising a flange and skirt, said frame being secured onto the inside of the top cover of the outer structure with said flange, said skirt extending upwards and inwards through the bottom portion of said rotatable cylinder, said net adherent to said frame;

an annular water guiding plate which is corrugated and which slants downwards between the skirt of the screen and the beams of the bracket from the side wall of said outer structure;

an annular water collecting plate which also slants downwards from the side wall of the outer structure;

a louver disposed under the outer structure to allow for ventilation, a water tank under the louver which receives the cooled water falling therein;

a floating valve extending from the wall of said water tank which controls the amount of water within said water tank;

an outlet which is disposed on said water tank which allows water to flow out;

a base which supports the whole structure; and a sprayer head being positioned above the opening of the top cover of the outer structure which seperates the high temperature water into small droplets.

* * * * *